W. McCONWAY, Jr. & J. KELSO.
CAR COUPLING.
APPLICATION FILED FEB. 13, 1907.
913,229.
Patented Feb. 23, 1909.
4 SHEETS—SHEET 4.
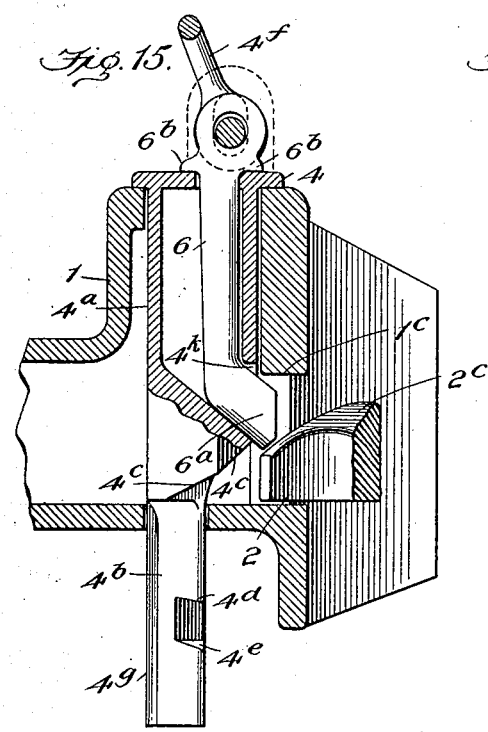
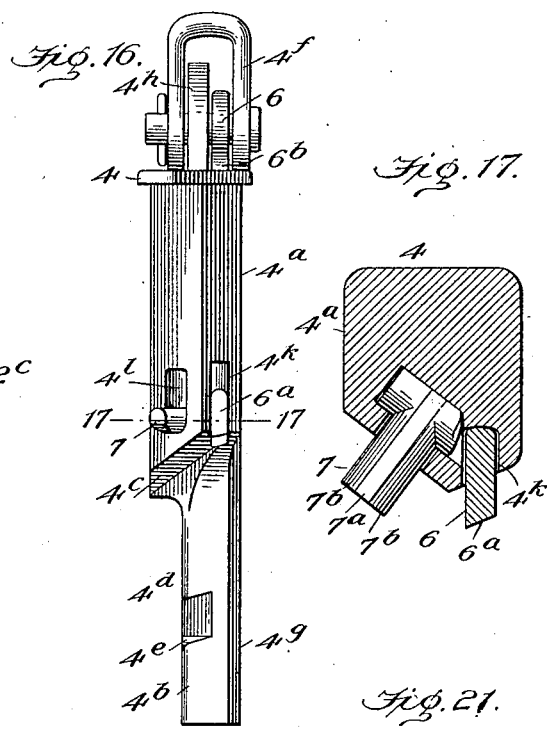
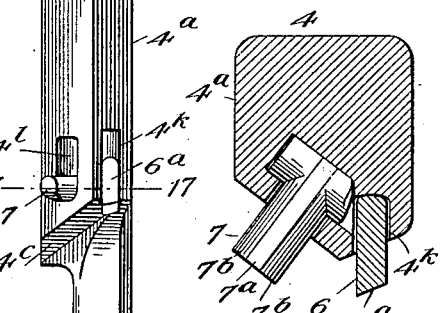
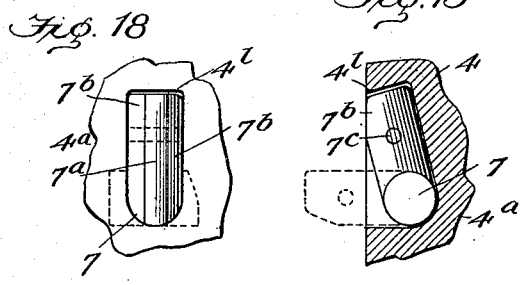
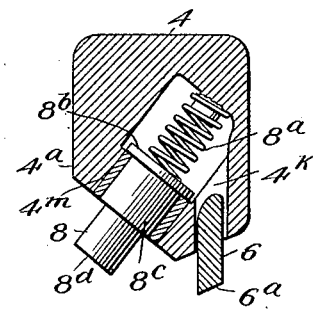
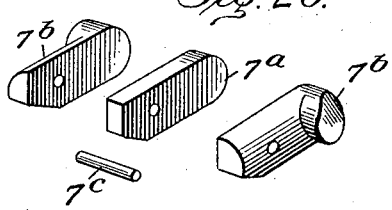
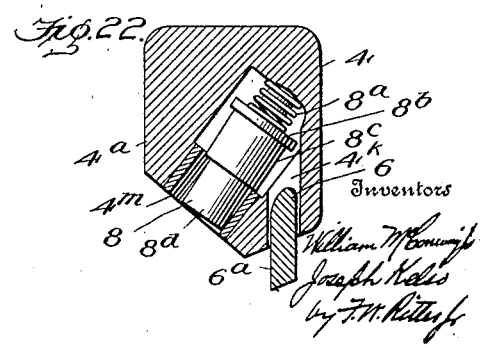
Witnesses
Edwin L. Bradford
Inventors
William McConway
Joseph Kelso
by F. W. Ritter Jr.
Attorney

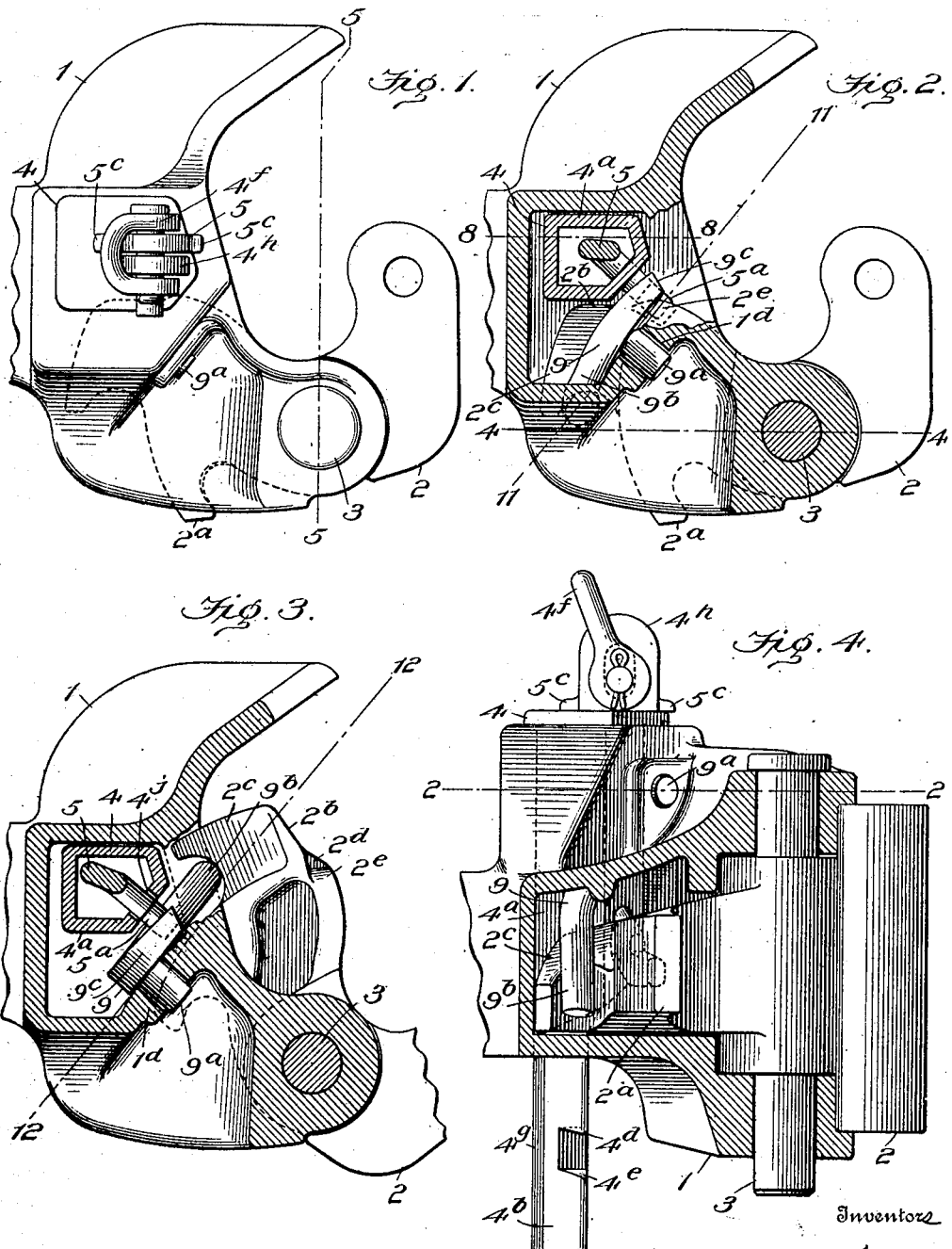

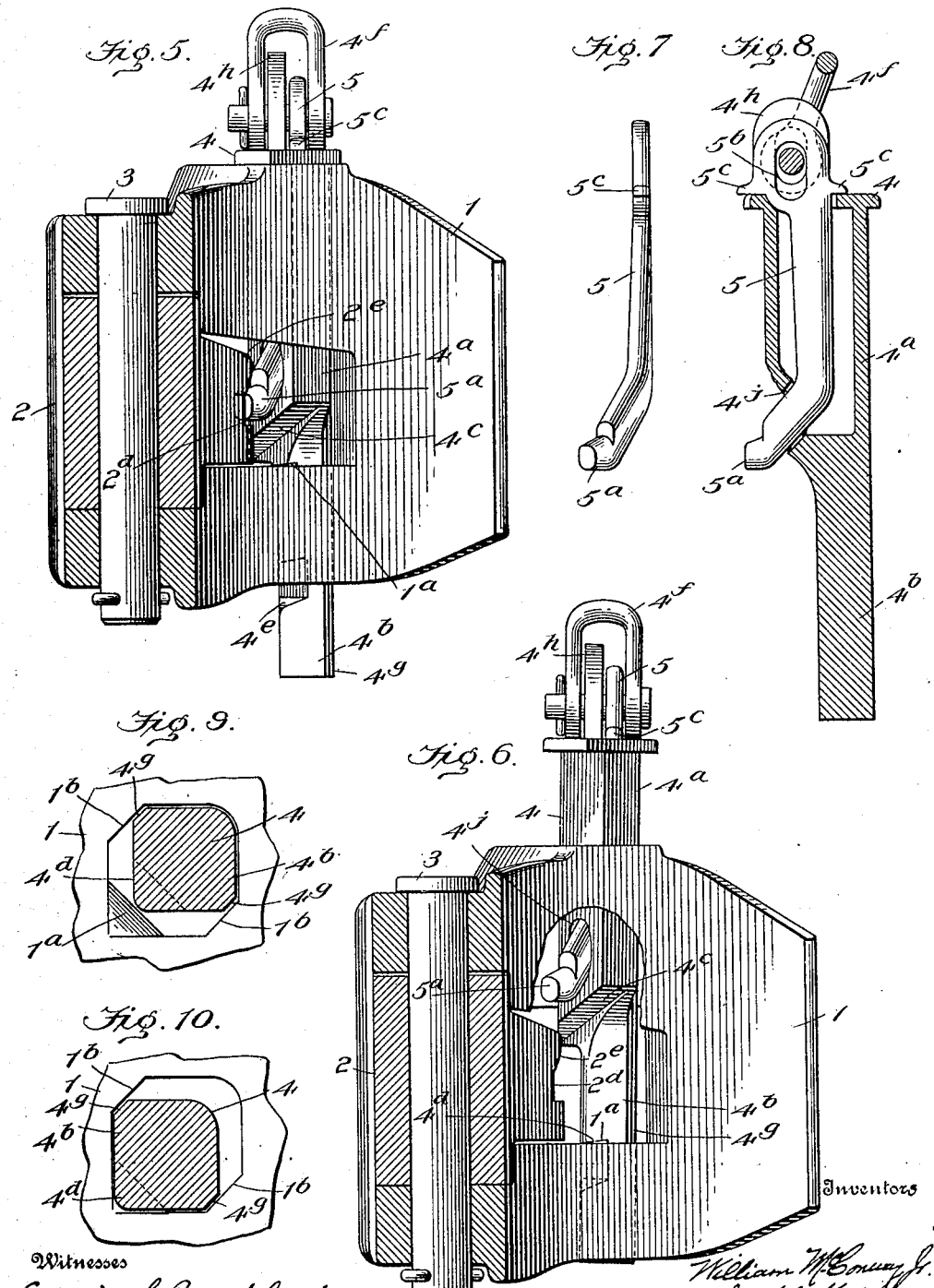

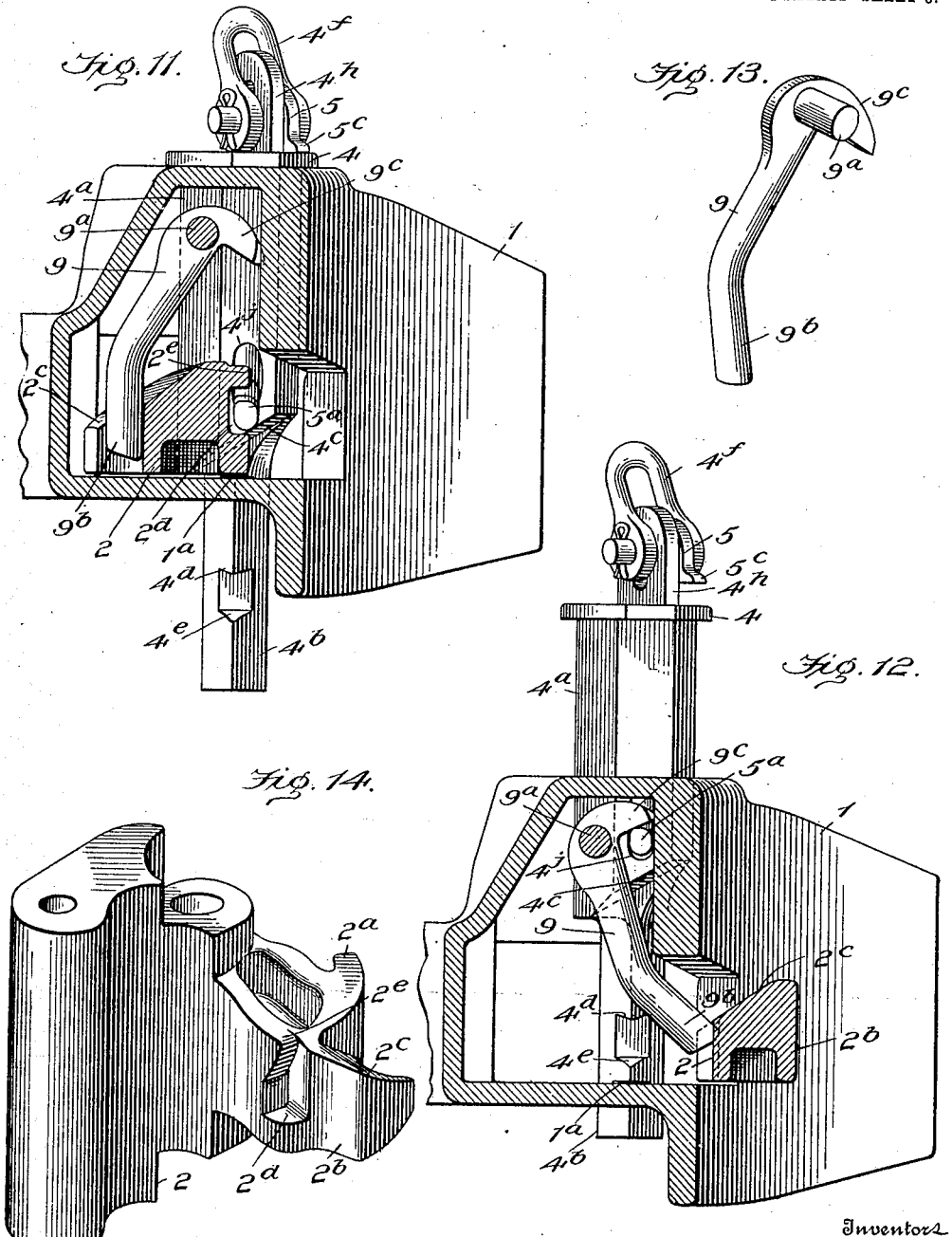

UNITED STATES PATENT OFFICE.

WILLIAM McCONWAY, JR., AND JOSEPH KELSO, OF PITTSBURG, PENNSYLVANIA, ASSIGNORS TO THE McCONWAY & TORLEY COMPANY, OF PITTSBURG, PENNSYLVANIA, A CORPORATION OF PENNSYLVANIA.

CAR-COUPLING.

No. 913,229.　　　　Specification of Letters Patent.　　　Patented Feb. 23, 1909.

Application filed February 13, 1907. Serial No. 357,189.

*To all whom it may concern:*

Be it known that we, WILLIAM McCONWAY, Jr., and JOSEPH KELSO, citizens of the United States, residing at Pittsburg, in the county of Allegheny and State of Pennsylvania, have invented certain new and useful Improvements in Car-Couplers; and we do hereby declare the following to be a full, clear, and exact description of the invention, such as will enable others skilled in the art to which it appertains to make and use the same.

This invention relates to the construction of car couplers of the vertical plane or Master Car Builders' type, and has for its object to provide in a single organized mechanism consisting of a few simple parts, efficient means for locking the knuckle in closed position, for locking the knuckle-locking means in locked position to prevent accidental uncoupling, for maintaining the knuckle-locking means in an unlocked position to permit a subsequent uncoupling movement of the knuckle, and for causing the knuckle to be rotated to an uncoupled position through the instrumentality of the knuckle-locking means.

While this invention is directed to certain features of construction which are novel and important in themselves, it particularly relates to the manner in which the parts are operatively combined to enable the knuckle opener to efficiently apply power to the knuckle throughout the entire opening movement of the latter.

The principal feature of the invention consists in combining with a coupler-head, its pivoted knuckle and locking mechanism for said knuckle, knuckle-opening mechanism whereof the member which applies power directly to the knuckle revolves, or moves in a plane at an angle to the longitudinal axis of the coupler, such that the intersection thereof with the bottom wall of the coupler head passes out of the mouth of the coupler and intersects the arc described by the inner end, or tail, of said knuckle.

There are other features of invention residing in elemental combinations and particular construction of parts, all as will hereinafter more fully appear.

In the drawings chosen for the purposes of illustrating this invention, the scope whereof is pointed out in the claims, Figure 1 is a top plan view of one form of car coupler embodying our invention, the parts being shown in locked position; Fig. 2 is a horizontal section of the construction illustrated in Fig. 1, taken in the plane indicated by the line 2—2, Fig. 4, the parts being shown in locked position, and a portion of the coupler head adjacent to the mouth being broken away; Fig. 3 is a horizontal section also taken in the plane indicated by the line 2—2, Fig. 4, but illustrating the relative positions of the several parts when the knuckle is fully opened by means of the knuckle actuating mechanism; Fig. 4 is a vertical section taken in the plane indicated by the line 4—4, Fig. 2, the parts being shown in locked position; Fig. 5 is a vertical section taken on the line 5—5, Fig. 1, the parts being shown in locked position; Fig. 6 is a vertical section also taken on the line 5—5, Fig. 1, but showing the relative position of the parts when the knuckle-locking means is set to permit a subsequent outward rotation of the knuckle; Fig. 7 is a detail view in front elevation of the member which locks the knuckle-locking means against accidental unlocking and which actuates the knuckle-opener member; Fig. 8 is a detached view looking toward the knuckle, of the knuckle-locking means and the member shown in Fig. 7, with which such locking means is associated, the view being taken in the vertical plane indicated by the line 8—8, Fig. 2, and a part of the knuckle-locking means being broken away to more clearly disclose the associated member; Fig. 9 is an enlarged detail view showing the relation of the knuckle-locking means and the bottom wall of the coupler head when the parts are in locked position; Fig. 10 is a view corresponding to Fig. 9, but showing the relation of the same parts when the knuckle locking means is set to permit a subsequent uncoupling movement of the knuckle; Fig. 11 is a vertical section taken in the plane indicated by the line 11—11, Fig. 2, the parts being in locked position; Fig. 12 is a vertical section taken in the plane indicated by the line 12—12, Fig. 3, the parts being shown in the position illustrated in the latter figure; Fig. 13 is a detail perspective view of the knuckle-opener member shown in the several figures; Fig. 14 is a detail perspective view of the knuckle shown in the several figures; Fig. 15 is a vertical longitudinal section of a modified form of coupler embodying our invention, parts of the knuckle-locking means and knuckle being broken away, and the members being shown in the positions they occupy when the knuckle has been opened subsequent to the setting of the lock for that purpose; Fig. 16 is a detached view in front elevation showing the knuckle-locking means and associated members employed in the modified construction illustrated in Fig. 15; Fig. 17 is an enlarged detail section taken in the horizontal plane indicated by the line 17—17, Fig. 16; Figs. 18, 19 and 20, are enlarged detail views showing the construction and arrangement of the knuckle-opener actuating device with which the knuckle-locking means shown in Fig. 15 is provided; and Figs. 21 and 22 are enlarged detail sections also taken in the horizontal plane indicated by the line 17—17 Fig. 16, but illustrating a further modification of the knuckle-opener actuating device with which the knuckle-locking means may be provided.

Like symbols refer to like parts wherever they occur.

We will now proceed to describe our invention more fully so that others skilled in the art to which it appertains may apply the same.

In the drawings, 1 is the coupler head upon which the knuckle 2 is pivotally mounted by means of a knuckle pin 3, or in other suitable manner. The tail of the knuckle 2 may be provided with means, for example a hook $2^a$, for preventing the disassociation of said knuckle and head in the event the knuckle pin 3 should be broken in service, such hook portion $2^a$ passing through an aperture in the side of the coupler head in the usual manner. The knuckle 2 is also provided with means for permitting the automatic locking of the coupler when the said knuckle is rotated from an open to a closed position. For this latter purpose the inner extremity of the tail of the knuckle 2 at a point adjacent to the locking face $2^b$ thereof may be formed with an incline $2^c$ which slopes downwardly from the said locking face or abutment $2^b$, toward the inner lateral face of the knuckle. This incline $2^c$ coöperates with a corresponding inclined face formed upon the knuckle-locking means, as well hereinafter appear.

In addition to the features heretofore described, the knuckle 2 is recessed, as at $2^d$, to afford clearance for the knuckle-opener actuating member carried by the lock, said recessed portion being preferably somewhat extended to form a socket with an overhanging inclined shelf $2^e$ under which the lower end $5^a$ of that form of knuckle-opener actuating member 5, shown in the principal figures of the drawing, passes to prevent accidental unlocking of the knuckle-locking means.

As a means for locking the knuckle in coupled position, a vertically sliding gravity lock 4 is preferably employed. The upper portion $4^a$ of this lock is cored out, not only for lightness, but also to form a chamber within which may be housed a so-called lock-to-the-lock, when such is desired to be employed. The lower portion $4^b$ of the lock, which extends downwardly through an opening in the bottom wall of the coupler head and thus assists in guiding the lock is of less cross-sectional area than the body or knuckle-restraining portion thereof, and is so located as to permit the rotation of the knuckle 2 when the lock 4 is in an unlocked position.

As a means for permitting the automatic locking of the knuckle 2 when the latter is rotated from an uncoupled to a coupled position, the lock 4 is provided, at the junction of the locking portion $4^a$ and lock-set extension $4^b$, with an inclined face $4^c$ which corresponds with the incline $2^c$ upon the tail of the knuckle. By means of these coöperating inclines $2^c$ and $4^c$, the inward rotation of the knuckle 2 causes the lock 4 to be elevated sufficiently to allow the knuckle to assume a locked position, after which the said lock 4 falls to a locked position in front of the knuckle tail, as will be readily understood.

For the purpose of supporting the lock 4 in an unlocked position so that the knuckle may be subsequently rotated to an open position, the lock-set extension $4^b$ is provided with a lock-set shoulder $4^d$ so located with respect to the locking portion $4^a$ of the lock, that the said locking portion is held elevated above the tail of the knuckle when said shoulder $4^d$ is supported upon the coupler head. It is preferred to form this shoulder $4^d$ as the upper wall of a notch which is of slightly greater length than the thickness of the bottom wall of the coupler head at the point where such notch engages said head; but, if desired, a simple shoulder may be employed. The said shoulder $4^d$ is preferably inclined, as shown, and the corresponding part $1^a$ of the coupler head is also preferably similarly inclined, as by this means the lock 4 is more securely supported in a lock-set position, since the weight of the lock thus opposes the disengagement of the parts. When a lock-set notch is employed, the lower face $4^e$ thereof is also inclined, to the end that said face $4^e$ may not catch upon the under face of the lower wall of the coupler head and prevent the extended upward movement of the lock necessary to actuate the knuckle-opener member.

In order that the lock-set shoulder $4^d$ may be brought into engagement with the lock-set seat $1^a$ on the coupler head when it is desired to support the lock to permit the knuckle to be opened, the usual clevis $4^f$ is pivotally mounted upon said lock in such manner that the lock-set extension $4^b$ thereof will swing forward toward the mouth of the coupler head whenever the lock-set notch is in apposition with the lower wall of the said coupler head; but as it is desirable that the tail of the knuckle 2, when passing to an open position after the lock has been set in an unlocked position, shall positively force the lock-set shoulder 4$^d$ off its seat 1$^a$ in such manner that the wear upon the said lock and knuckle shall be small, it is preferred to form the hole through which the lock-set extension 4$^b$ passes with one or more marginal faces 1$^b$, which are disposed at an angle to the longitudinal axis of the coupler and, to avoid undue wear, either to form the said lock-set extension with corresponding vertical faces 4$^g$ or to round off the adjacent portions of such part 4$^b$. By this means the forward movement of the lock-set extension 4$^b$, when the lock is raised to an unlocked position, is modified by a lateral component, so that the resultant movement by which the lock-set shoulder 4$^d$ of the lock-set extension is caused to engage the lock-set seat 1$^a$, is toward the knuckle and toward the knuckle pin 3 thereof.

When a lock-to-the-lock of the character shown in the several figures of the drawings is to be employed it is preferred to form the lug 4$^h$ by means of which the clevis 4$^f$ is attached to the lock 4 with an elongated slot or eye, so that the clevis bolt which passes therethrough may have a preliminary movement sufficient to operate said lock-to-the-lock device before the lock 4 is raised.

In the construction illustrated in Figs. 1 to 14, inclusive, of the drawings, the lock 4 is provided, at a point near the lower part of the locking portion 4$^b$ thereof, with an inclined opening 4$^j$, which pierces that wall of the lock adjacent to the knuckle which is at an angle of approximately forty-five degrees to the longitudinal axis of the coupler.

In the modified construction shown in Figs. 15 to 20, inclusive, an inclined opening 4$^k$ is provided in the lower part of the front wall of the locking portion 4$^a$ of the lock, and a socket or opening 4$^l$ corresponding in location to the opening 4$^j$ is also provided.

In the construction shown in Figs. 21 and 22 the lock 4 is provided with an opening such as 4$^k$, but the socket or opening 4$^m$ there illustrated is of slightly different form from those shown in the preceding figures. The features 4$^j$, 4$^k$, 4$^l$ and 4$^m$, will be hereinafter more fully described.

In the preferred form of construction in which we embody our invention, the lock-to-the-lock element 5 also performs the function of a knuckle-opener actuating member. To serve these purposes said member 5 is made angular in form, the upper portion being housed within the chamber of the lock 4, and the lower portion passing out through the inclined aperture 4$^j$ of said lock and terminating in a portion 5$^a$ which extends toward the recess 2$^d$ of the knuckle. The upper end of the member 5 is provided with an elongated slot 5$^b$ through which the bolt of the clevis 4$^f$ passes and also with a stop or stops 5$^c$ which limit the downward movement of said member 5 with respect to the lock 4. In this construction the initial unlocking movement of the clevis 4$^f$ causes an immediate upward movement of the member 5, relative to the lock 4, since the clevis bolt which is attached to both of said members is arranged to engage and lift the member 5, while yet moving freely in the elongated slot of the lug 4$^h$ of the lock. By reason of the inclination of the lock opening 4$^j$ and the corresponding inclination of that part of the member 5 which passes through said lock opening, this relative movement of the lock 4 and lock-to-the-lock member 5 causes an upward lateral movement of the end 5$^a$ of the latter, such movement being sufficient to withdraw said end portion 5$^a$ from beneath the over hanging lug or shelf 2$^e$ of the knuckle and thus permit the lock 4 to be raised by the further unlocking movement of the clevis. The upward lateral movement of the end portion 5$^a$ of the member 5 is, however, not of such extent as to retract said end portion 5$^a$ wholly within the inclined opening 4$^j$ of the lock, as the engagement of the clevis bolt with the upper end of the slot in the lug 4$^h$ arrests the retractile movement of the portion 5$^a$, while it still projects from the lock far enough to engage and actuate the knuckle-opener member, as will hereinafter appear. The end portion 5$^a$ of the member 5 may, however, be wholly withdrawn into the lock opening 4$^j$, when it is desired to insert or remove the lock 4 from the coupler without detaching the clevis 4$^f$, the elongated slot 5$^b$ permitting the necessary additional retractile movement.

The lock-to-the-lock member 6 shown in the modifications illustrated in Figs. 15 to 22, inclusive, of the drawings does not actuate the knuckle-opener member, as is the case in the preferred construction, since such modifications are especially intended to illustrate a form of our invention in which a lock-to-the-lock element may obviously be omitted if desired. In said modifications the lock-to-the-lock member 6 is angular in form, the upper portion thereof being housed within the lock 4 and the lower portion 6$^a$ passing out through the correspondingly inclined opening 4$^k$ in the front of the lock. The upper end of said member 6 is provided with a hole for the reception of the bolt of the clevis 4$^f$ and it may also be provided with limit lugs 6$^b$, if desired. When the lock 4 is in locked position the lower end 6$^a$ of the member 6 stands beneath the upper marginal wall 1ᶜ of the coupler mouth, and the said lock 4 may not be brought to an unlocked position unless said portion 6ᵃ be first withdrawn from beneath the adjacent portion of the coupler head. This withdrawal of the member 6 from beneath the marginal wall 1ᶜ of the mouth of the coupler is accomplished in the same manner as is the retractile movement of the member 5 heretofore described.

In the modification shown in Figs. 15 to 20, inclusive, the member 7, with which the lock 4 is provided for the purpose of actuating the knuckle-opener member, is pivotally attached to said lock 4 and is adapted to be turned up into the lock recess 4ˡ to permit the introduction and withdrawal of the said lock from the coupler head as will be readily understood from Figs. 16, 17, 18 and 19 of the drawings. This knuckle-opener actuating member 7 normally stands in the position shown in Figs. 16 and 17, being so pivoted in the lock recess 4ˡ that it gravitates to a position in which it is adapted to engage the knuckle-opener member 9 when the lock 4 is sufficiently raised. In order that said member 7 may be readily inserted in the socket 4ˡ of the lock, it is preferred to construct it in three parts, the part 7ᵃ being interposed between the trunnion section 7ᵇ and the several parts being secured together by means of a pin 7ᶜ, as will be readily understood upon reference to Fig. 20.

In the modification illustrated in Figs. 21 and 22, the knuckle-opener actuating member 8 is formed as a finger which is normally projected through the opening 4ᵐ of the lock 4 by means of a spring 8ᵃ. The member 8 is preferably constructed as a plurality of cylinders of different diameters. The inner cylinder 8ᵇ, upon which the spring 8ᵃ bears, abuts the inner end of the bushing with which the lock opening 4ᵐ is provided and thus limits the outward movement of the finger 8, while the intermediate cylinder 8ᶜ, which is somewhat larger than the outer terminal cylinder 8ᵈ, closely fits the interior of the said bushing to prevent lost motion when the knuckle-opener member 9 is actuated. By such a construction, the finger 8 may, as shown in Fig. 22, be maintained in a retracted position when desired. As a means for automatically throwing the knuckle 2 to open position during an extended unlocking movement of the lock 4, a knuckle-opener member 9 is provided. This knuckle-opener 9 is so arranged that it moves in a plane at an angle to the longitudinal axis of the coupler, such that the intersection of said plane with the bottom wall of the coupler head passes out of the mouth of the coupler within the arc described by the tail of the knuckle 2. By this means the force applied to the tail of the knuckle is nearly tangential to the direction of movement of the point thereof to which power is applied throughout the entire outward rotation, and the full force is available until the knuckle-opening movement is completed. A construction permitting such an arrangement has many attendant advantages in addition to those heretofore enumerated; thus, there is little grinding action between the knuckle-opener member and the knuckle tail, and the lever arm from the knuckle-pin 3 to the point of application of power remains constant or approximately constant throughout the entire opening movement of the knuckle.

While some of the advantages of our invention may be attained by causing the knuckle-opener member 9 to operate in any plane which cuts the longitudinal axis of the coupler at an angle less than ninety degrees, it is preferred to so construct and arrange said member 9 that it operates in a plane making an angle of forty-five degrees, or thereabout, with the longitudinal axis of the coupler, as in such a construction the knuckle-opener mechanism operates most efficiently. In the several figures of the drawings, this knuckle-opener member 9 is shown as a bell crank-lever, which is provided with a horizontal pivot-pin or lug 9ᵃ that preferably somewhat loosely fits the corresponding opening 1ᵈ in the coupler head 1. The axis of the pivot lug 9ᵃ is preferably arranged so that it is not quite radial with respect to the knuckle-pin 3, it being found desirable to so locate the parts that the center of the knuckle-pin 3 shall be between the mouth of the coupler head and the produced axis of the said pivot lug, as such a construction permits the knuckle-opener member 9 to somewhat more effectually apply power to the knuckle toward the end of the opening movement of the latter.

That arm 9ᵇ of the knuckle-opener member 9 which directly engages and actuates the knuckle is curved or angled downward from the pivot lug 9ᵃ so that its lower end stands behind the tail of said knuckle, preferably in a curved recess formed in the tail of the knuckle at the rear end of the knuckle incline 2ᶜ. The other arm 9ᶜ of said member 9 projects toward said lock 4 in such manner that it may be engaged and operated by the knuckle-opener actuating member carried by said lock.

The face of the arm 9ᶜ which is nearer the lock 4 is preferably beveled or inclined, so that the knuckle-opener member 9 may tilt somewhat with respect to said lock. By this means, and by reason of the fact that the knuckle-opener 9 is loosely pivoted and has a slight play between the coupler head and the lock 4, the pivot pin or lug 9ᵃ is relieved from all strain and the knuckle-opener member may readily adapt itself to slight angular changes during an opening movement of the knuckle 2. The knuckle-lock 4, it will be observed, operates to maintain the pivotal engagement of the knuckle opener with the coupler head.

The operation of that form of construction shown in Figs. 1 to 14, inclusive, of the drawings will be as follows. Assuming the parts to be in locked position, as shown in Figs. 1, 2, 4, 5 and 11, an upward pull upon the clevis $4^f$ first causes the lower end $5^a$ of the lock-to-the-lock member 5 to be withdrawn from beneath the overhanging shelf $2^e$ of the knuckle, as has been heretofore described. A continued upward pull upon the clevis $4^f$ then causes the lock 4 to be elevated sufficiently to permit an uncoupling rotation of the knuckle 2. Should the coupler be in engagement with another coupler, the knuckle 2 could not be opened by means of the knuckle opening devices so that in such a case upon releasing the upward pull upon the clevis $4^f$ the lock 4 would be supported in an unlocked position through the engagement of the lock-set shoulder $4^d$, and the lock-set seat $1^a$ of the coupler-head as heretofore described. When the lock 4, as shown in Figs. 6 and 10, is supported in an unlocked position to permit a subsequent uncoupling movement of the knuckle 2, an outward rotation of said knuckle will cause said lock-set shoulder $4^d$ to be displaced from its seat $1^a$ by the knuckle 2, and said lock will thereupon fall either to a wholly locked position or to a position in which the lock incline $4^c$ engages the corresponding incline $2^c$ upon the knuckle, the extent of fall of said lock depending on the extent of opening of the knuckle. When the lock 4 is in a lowered position, a locking rotation of the knuckle will cause the incline $2^c$ upon the latter to engage the lock incline $4^c$ and the lock will be thus actuated to permit an automatic coupling operation. Should the knuckle 2 be free to rotate, however, when the locking portion $4^a$ of the lock 4 has been elevated sufficiently to permit an uncoupling rotation of the knuckle, an extended upward movement of the lock 4 will cause the knuckle-opener actuating portion $5^a$ of the member 5 to engage the arm $9^c$ of the knuckle-opener member 9 and thereby cause the latter to be rotated. The rotation of the knuckle-opener member 9, acting through the knuckle engaging arm $9^b$ thereof, thus causes the knuckle 2 to be swung to open position, as will be readily understood. When the upward pull upon the clevis $4^f$ is released after a knuckle-throwing operation of the devices and the lock 4 falls to a locked position, said lock may be automatically actuated by a coupling rotation of the knuckle, as before described. When the lock 4 is set to permit a subsequent outward rotation of the knuckle 2, as shown in Figs. 6 and 10, said lock may be manually returned to a locked position without the necessity of opening the knuckle, a slight lateral movement of the top of the lock accomplishing the necessary disengagement of the lock-set shoulder $4^d$ and lock-set seat $1^a$.

In the modified constructions illustrated in Figs. 15 to 22, inclusive, an upward pull upon the clevis $4^f$ first causes the withdrawal of the end portion $6^a$ of the lock-to-the-lock member 6 from beneath the wall $1^c$ of the coupler head. When this is accomplished the lock 4 may be raised to unlock the knuckle and cause the latter to be thrown open. Both forms of knuckle-opener actuating members 7 and 8 shown in these figures perform the same function, namely, engage the arm $9^c$ of the knuckle-opener member 9 and cause the rotation of said knuckle opener member in the same manner as does the end $5^a$ of the member 5 already described.

By reference to Fig. 15 it will be observed that when the knuckle 2 is open and the lock 4 is in a locked position, the lower end $6^a$ of the lock-to-the-lock member 6 occupies a position directly beneath the wall $1^c$ of the coupler head. When the parts are in such position, however, a coupling rotation of the knuckle causes the incline $2^c$ thereof to engage and force said end portion $6^a$ rearwardly before said incline comes into engagement with the corresponding lock incline $4^c$.

Except in the particulars hereinbefore pointed out, the modified forms of our invention illustrated are the same in construction and operation as the preferred embodiment thereof.

Having thus described our invention, what we claim and desire to secure by Letters Patent, is:

1. In a car coupler, the combination with the coupler head, of a knuckle pivotally mounted upon said head, a sliding gravity lock for said knuckle, said lock having a face located and operating in a plane at an angle to the longitudinal axis of the coupler such that said plane intersects the mouth of the coupler head within the arc described by the tail of said knuckle, and a knuckle-opener member which is arranged adjacent to and in contact with said lock and operates in a plane substantially parallel with the said angularly disposed face of said lock.

2. In a car coupler, the combination with the coupler head, of a knuckle pivotally mounted upon said head, a knuckle-opener member which operates in a plane oblique to the longitudinal axis of said coupler, and a vertically movable gravity lock having a face disposed and operating in a plane which is substantially parallel to the plane of operation of the said knuckle-opener, said lock operating to maintain said knuckle-opener in operative position.

3. In a car coupler, the combination with the coupler head, of a knuckle pivotally mounted upon said head, a lock for said knuckle, and a lock-to-the-lock member a portion of which is housed within said lock and a portion of which is adapted to engage said knuckle to thereby lock said lock in locked position.

4. In a car coupler, the combination with the coupler head, of a knuckle pivotally mounted upon said head, a lock for said knuckle, and a lock-to-the-lock member a portion of which is housed within said lock and a portion of which projects through an opening in said lock and is adapted to engage said knuckle to thereby lock said lock in locked position, the said portions of the lock-to-the-lock member being at an angle to each other such that said lock-to-the-lock member may be caused to move into and out of engagement with said knuckle by being moved relatively to said lock.

5. In a car coupler, the combination with the coupler head, of a knuckle pivotally mounted upon said head, a lock for said knuckle, a knuckle-opener member which operates in a plane at an oblique angle to the longitudinal axis of the coupler, and means adapted to engage said knuckle to lock said lock in locked position, said means being also adapted to actuate said knuckle-opener member.

6. In a car coupler, the combination with the coupler head, of a knuckle pivotally mounted upon said head, said knuckle having an inclined face which is adapted to coact with a correspondingly inclined face upon the lock to permit automatic locking of the knuckle, a knuckle-lock having an inclined face, and a knuckle-opener member which operates in a plane at an oblique angle to the longitudinal axis of the coupler, said knuckle-opener member being maintained in operative position by said knuckle-lock.

7. In a car coupler, the combination with the coupler head, of a knuckle pivotally mounted upon said head, a lock for said knuckle, a knuckle-opener member, and means adapted to engage said knuckle to lock said lock in locked position, said means being also adapted to actuate said knuckle-opener member.

8. In a car coupler, the combination with a coupler head, of a knuckle having an inclined face, a lock for said knuckle having an inclined face which is adapted to coact with the inclined face upon the knuckle to permit automatic locking of the latter, said lock being adapted to engage a portion of the coupler head and be thereby supported in unlocked position, and a knuckle-opener member which operates in a plane at an oblique angle to the longitudinal axis of the coupler, and a lock-to-the-lock member which is adapted both to lock the lock in locked position and to actuate the knuckle-opener member, the portion of the lock-to-the-lock member which engages the knuckle-opener member being capable of movement transversely with respect to said knuckle-lock.

9. In a car coupler, the combination with the coupler head, of a knuckle pivotally mounted upon said head, a lock for said knuckle, a knuckle-opener member pivotally mounted upon said head, and a lock-to-the-lock member a portion of which is housed within said lock and a portion of which is adapted to actuate said knuckle-opener member and also to engage said knuckle to lock said lock in locked position.

10. In a car coupler, the combination with the coupler head, of a knuckle pivotally mounted upon said head, a lock for said knuckle, and a lock-to-the-lock member movably mounted upon said lock, said knuckle being provided with an overhanging shelf under which a portion of the lock-to-the-lock member stands when the parts are in locked position.

11. In a car coupler, the combination with the coupler head, of a knuckle pivotally mounted upon said head, a sliding gravity lock for said knuckle, said lock having a face located and operating in a plane at an angle to the longitudinal axis of the coupler such that said plane intersects the mouth of the coupler head within the arc described by the tail of said knuckle, and a knuckle-opener operating in contact with the said angularly disposed face of the lock.

12. In a car coupler, the combination with the coupler head, of a knuckle having a recessed portion formed with an extension having an overhanging shelf, a lock for said knuckle having a lock-set extension provided with an inclined lock-set shoulder, a bell-crank knuckle-opener lever which is pivotally mounted upon said head at an oblique angle to the longitudinal axis of the coupler, and a lock-to-the-lock member which is adapted to enter the said knuckle recess and engage the overhanging shelf thereof and which is also adapted to actuate the said knuckle-opener lever.

13. In a car coupler, the combination with the coupler head, of a knuckle pivotally mounted thereon, a lock for said knuckle, and a knuckle opener member which is pivotally mounted upon said coupler head and is maintained in operative position by said lock.

14. In a car coupler, the combination with the coupler head, of a pivoted knuckle having an inclined face, a lock for said knuckle having an inclined face which is adapted to coact with the inclined face upon the knuckle to permit automatic locking of the latter, a knuckle-opener member, and a lock-to-the-lock member which is adapted to engage said knuckle to lock said lock in locked position and which is also adapted to actuate said knuckle-opener member.

In testimony whereof we affix our signatures, in presence of two subscribing witnesses.

WILLIAM McCONWAY, Jr.
JOSEPH KELSO.

Witnesses:
   Geo. W. McCandless,
   John Konstanzer.